UNITED STATES PATENT OFFICE.

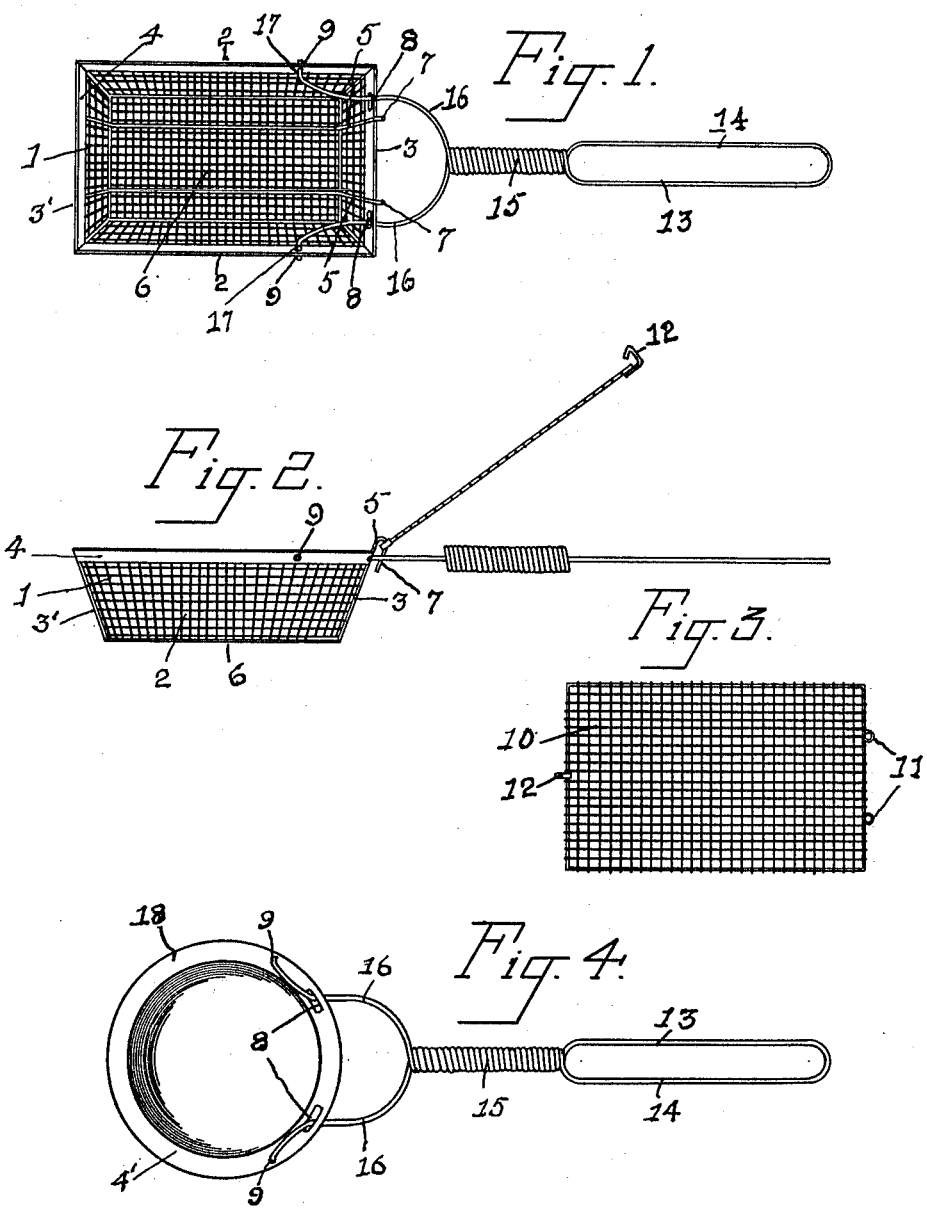

CLAUDE C. CORNWELL, OF TOLEDO, OHIO.

CORN-POPPER WITH DETACHABLE HANDLE AND LID.

1,039,261.   Specification of Letters Patent.   Patented Sept. 24, 1912.

Application filed February 14, 1912. Serial No. 677,463.

*To all whom it may concern:*

Be it known that I, CLAUDE C. CORNWELL, a citizen of the United States, residing at Toledo, in the county of Lucas and State of Ohio, have invented new and useful Improvements in Corn-Poppers with Detachable Handles and Lids, of which the following is a specification.

My invention relates to a corn popper and has for its object to provide a convenient and inexpensive utensil of the kind having a detachable handle and lid, whereby the several parts may be readily separated, and large numbers of each part may be packed in compact packages, much more economical for shipment than the same number of parts assembled and thereby greatly reduce the cost of shipment per utensil. I accomplish these objects by the construction and combination of parts as illustrated in the drawings, in which—

Figure 1 is a top view of a corn popper constructed in accordance with my invention, showing the lid removed and the handle attached. Fig. 2 is a side view of the same with the lid attached and partly open. Fig. 3 is a top view of the lid, and Fig. 4 shows the same principle of construction applied to a light camp skillet.

In the drawings 1 designates a woven wire basket body having slightly flaring sides 2, and ends 3 and 3' provided with a narrow sheet metal rim 4. The end 3 is provided with the hinge wires 5 which extend parallel along the bottom 6 and up at the end slightly above the top of the rim 4 and have end portions curved outward and downward to form the open hook hinges 7.

At equal distances from the corners of the body between the hinges 7 and the corners, the rim 4 of the end 3 is provided with the slots 8, and at equal distances from the same corners the rim 4 at the sides 2 is provided with holes 9.

The body 1 is provided with a lid 10, comprising a wire frame complementary to the rim 4 and covered with wire netting. The lid is provided with hinge eyes 11 at one end adapted to receive the hinge hooks 7, and with a spring latch wire 12 at the opposite end adapted to engage the lower edge of the rim 4 at the end 3' when the lid is in position covering the body 1.

The body 1 is provided with a detachable handle 13 formed of a piece of spring wire of suitable length doubled to form the handle portion 14, the twisted portion 15 and having the remaining end portions formed into the opposite reverse curve spring fork arms 16, having their free ends 17 angled outward in alinement.

Thus constructed, and the lid 7 being attached to the hinge hooks 5, to attach the handle, the fork arms 16 are sprung inward and the ends 17 are inserted through the slot 8 after which the fork arms are pushed forward until the ends 17 enter the holes 9 of the rim 4. So attached, the handle 13 prevents the detachment of the lid 10 from the hinge hooks 7 and when open the lid 10 rests on the arms 16 of the handle.

When the parts are disassembled any desired number of the baskets 1 may be nested and formed into a complete bundle, and the handles and lids therefor respectively formed into separate compact bundles and the whole formed into one compact package occupying greatly less space than if assembled, and which may be shipped at much less cost.

It is manifest that the principle of construction shown and described for corn poppers may be advantageously used in other cooking utensils, and in Fig. 3 the handle 13 is shown attached to a light skillet body 18 having slots 8 and holes 9 formed on the rim 4' for the attachment of the handle and adapted especially for use in cooking outfits for camping purposes, where a compact packing for transportation is desirable.

What I claim to be new is—

In a cooking utensil of the kind described, the combination of an open topped receptacle comprising a bottom and a continuous wall flared therefrom, said wall having a rim portion provided with a pair of closed slots longitudinally parallel with the rim, and located on opposite sides of a line, if drawn through a point central of the rim portion, and with a pair of perforations in line at right angles to and on opposite sides of said line, a pair of hook hinges projecting outward from the rim between the slots, said hooks having their curved portions extending through the plane of the rim and their point portions extending between the plane of the slots and the plane of the bottom, a lid adapted to form a closure for the top of the receptacle and having hinge holes adapting it to be detachably hinged at one side to the hinge hooks, and a handle having diverging spring arms adapted, when sprung toward each other, to enter the slots of the rim, and having free end portions angled oppositely in alinement and adapted to enter the perforations of the rim when the arms, after being inserted through the slots, are released, whereby the handle is detachably secured to the rim portion of the receptacle in position locking the lid against detachment from the hooks.

In witness whereof, I, CLAUDE C. CORNWELL, have hereunto set my hand at Toledo, Ohio, this 9th day of February, 1912, in the presence of two subscribing witnesses.

CLAUDE C. CORNWELL.

In presence of—
JOHN E. CONNELL,
M. S. SMITH.

Copies of this patent may be obtained for five cents each, by addressing the "Commissioner of Patents, Washington, D. C."